J. E. KEILY.
CLOSURE FOR DISPENSING VESSELS.
APPLICATION FILED AUG. 24, 1910.
983,725.
Patented Feb. 7, 1911.
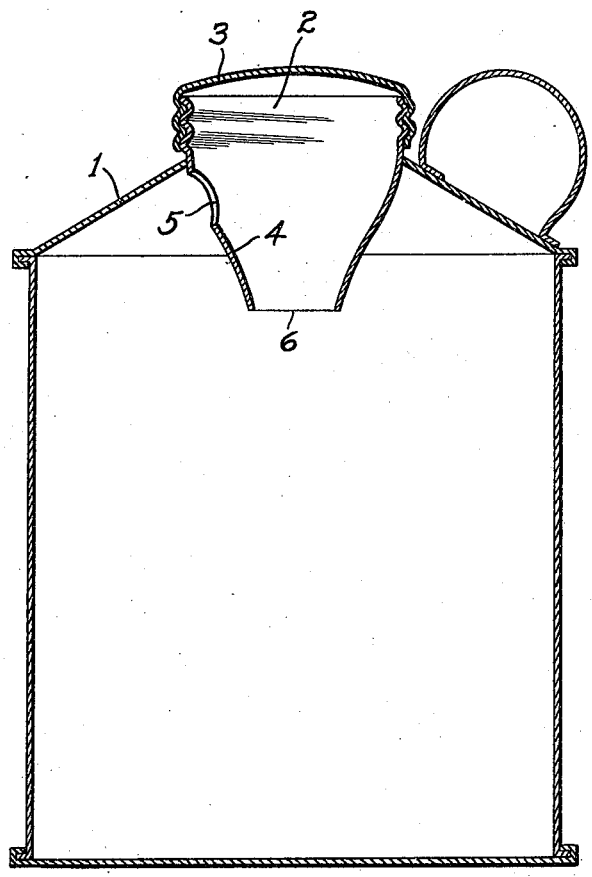
Witnesses:
E. W. Carroll
L. Thow
Inventor:
James E. Keily
Attorneys:
Osgood, Davis & Dorsey
by Farnum F. Dorsey

UNITED STATES PATENT OFFICE.

JAMES E. KEILY, OF ROCHESTER, NEW YORK.

CLOSURE FOR DISPENSING VESSELS.

983,725.  Specification of Letters Patent. Patented Feb. 7, 1911.

Application filed August 24, 1910. Serial No. 578,809.

*To all whom it may concern:*

Be it known that I, JAMES E. KEILY, a citizen of the United States, and resident of Rochester, in the county of Monroe and State of New York, have invented certain new and useful Improvements in Closures for Dispensing Vessels, of which the following is a specification.

This invention relates to dispensing vessels for fluid substances of all kinds.

The object of the invention is to produce a vessel which may be conveniently filled, without the use of a funnel or other extraneous device, and from which the contents may also be poured conveniently and without slopping and spilling.

To this end the invention consists in the dispensing vessel hereinafter described, as it is defined in the succeeding claim.

The drawing is a vertical median section of a dispensing vessel embodying the present invention.

The illustrated embodiment of the invention comprises a body 1, having a neck 2 which provides a wide opening for filling and emptying the vessel. This neck is screw-threaded, and is closed by a screw-threaded cap 3. The filling-opening is so wide that the vessel may be conveniently filled without the use of a funnel, such as is necessary where the filling-opening is narrow as in the dispensing vessels commonly in use. With such a wide opening, however, difficulty is encountered in pouring out the contents of a vessel without slopping and spilling. In the present invention, therefore, a funnel-shaped member 4 is fixed at its large end to the body 1 at the filling-opening. As shown in the drawings, this funnel-shaped member is made integral with the threaded neck 2, although it may obviously be constructed as a separate piece.

When the vessel is filled the liquid poured into it passes down through the contracted lower end 6 of the funnel 4. Near the upper end of the funnel is a lateral opening 5, and when the vessel is being filled this opening serves as an air-outlet, so that the funnel does not interfere with the filling operation. When the contents of the vessel are to be poured out, the vessel is tipped on its side and the contents then flow out through the opening 5, and through the wide filling-opening, while air may enter through the small end 6 of the funnel. In this manner the flow is restricted by the size of the opening 5, so that the contents may be poured out without slopping and spilling, with the same convenience as in the case of a vessel having a small filling-opening.

This invention is applicable to cans, jugs, or other various forms of vessels, and the funnel may be formed and connected with the body of the vessel in various ways, the essence of the invention consisting in the use of a funnel with a lateral opening, the funnel projecting inwardly from a wide filling-opening.

I claim:—

The combination, with the body of a dispensing vessel having an opening for filling and emptying the same, of a removable closure for said opening, and a funnel fixed, at its large end, in said opening and projecting into the body, the funnel having a lateral opening near its large end.

JAMES E. KEILY.

Witnesses:
 L. THON,
 D. GURNEE.